United States Patent [19]
Berglund

[11] Patent Number: 4,976,281
[45] Date of Patent: Dec. 11, 1990

[54] SAFETY VALVE ASSEMBLY FOR FLUID SYSTEM

[76] Inventor: Wilhelm A. Berglund, 6834 W. Ardmore, Chicago, Ill. 60631

[21] Appl. No.: 521,394

[22] Filed: May 10, 1990

[51] Int. Cl.⁵ .............................................. F16K 17/32
[52] U.S. Cl. .................................... 137/460; 137/462
[58] Field of Search ............... 137/498, 460, 462, 503, 137/501, 504

[56] References Cited

U.S. PATENT DOCUMENTS

| | | | |
|---|---|---|---|
| 1,448,193 | 3/1923 | Carr | 137/462 |
| 2,127,849 | 8/1938 | Stone | 137/498 X |
| 3,023,591 | 3/1962 | Tilney | 137/504 X |
| 3,476,141 | 11/1969 | Tillman | 137/498 |
| 3,779,273 | 12/1973 | Stone et al. | 137/460 |
| 3,805,824 | 4/1974 | Robbins | 137/504 |

Primary Examiner—Stephen M. Hepperle
Attorney, Agent or Firm—Kajane McManus

[57] ABSTRACT

The safety valve assembly of the present invention for use in a closed fluid system comprises a valve housing including a central throughbore divided into an inlet end and an outlet end which communicate with one another via an axial passageway parallel thereto. Access to an inlet of the passageway is controlled by a valve element which is movable between a standby position solely in response to a differential fluidic pressure developed when a leak develops in the closed fluid system downstream of the safety valve assembly to isolate the leak from the remainder of the system. A bleeder valve assembly is also provided to return the assembly to a standby position thereof once the downstream leak has been eliminated.

18 Claims, 1 Drawing Sheet

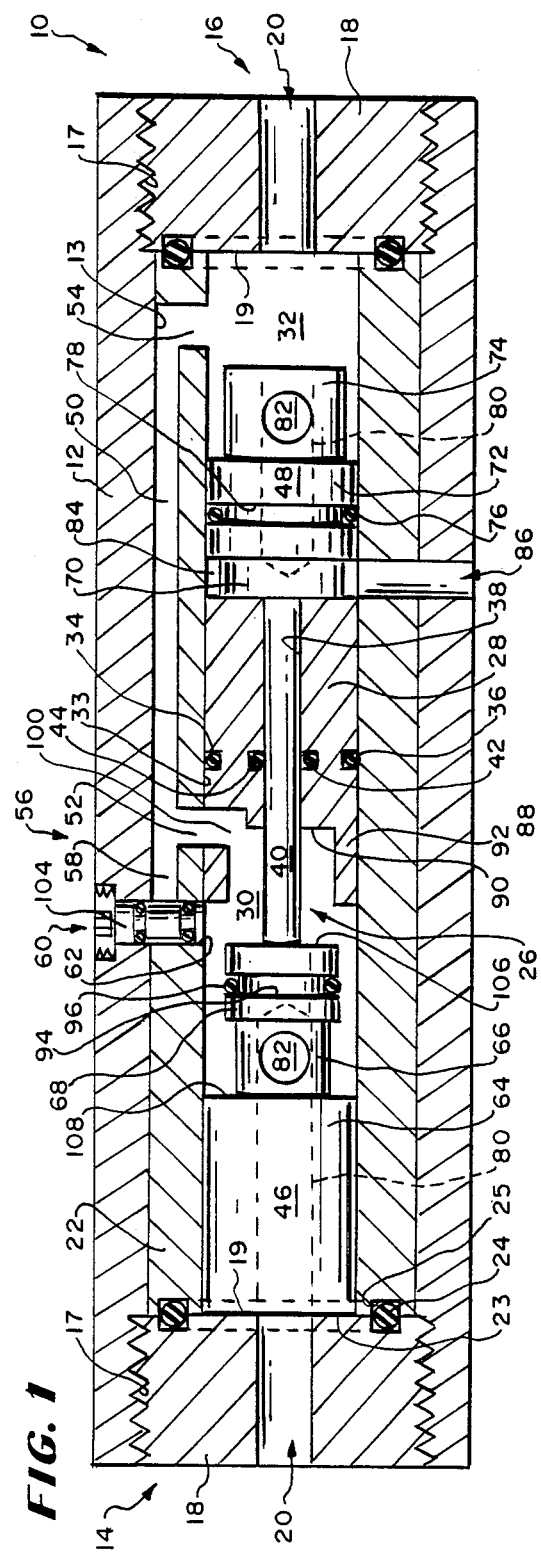
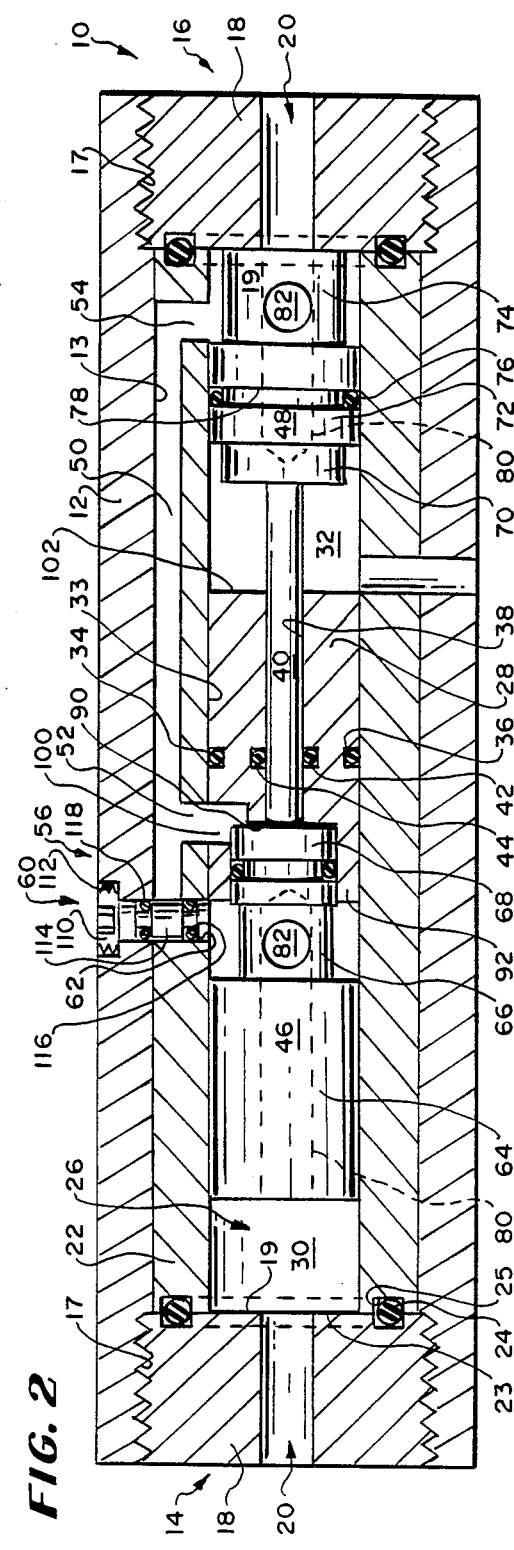
FIG. 1
FIG. 2

SAFETY VALVE ASSEMBLY FOR FLUID SYSTEM

BACKGROUND OF THE INVENTION

1 Field of the Invention

The present invention relates to a safety valve assembly for use in a closed fluid system, such as an air or hydraulic braking system. More particularly, the safety valve assembly provides a means by which a fluid line which is defective, causing a loss of pressure, may be effectively isolated from the system to maintain pressure within the remainder of the closed system.

2 Description of the Prior Art

Heretofore, various safety devices have been proposed for use in a closed fluid system, for controlling loss of pressure within same, when a portion of the system becomes defective.

All such previously proposed devices have notably included some sort of piston which is spring biased against a positive pressure such that, when pressure drops significantly, the piston is moved against the discharge end of the device by the spring to isolate the downstream section or branch of the system, allowing the remainder of the system to maintain pressurization, and thus function.

Examples of such previously proposed devices are to be found in: Owens U.S. Pat. No. 2,625,951; Berglund U.S. Pat. No. 3,109,448; Reese U.S. Pat. No. 3,141,302; Smith U.S. Pat. No. 3,325,996; Berglund U.S. Pat. No. 3,408,119 and 3,439,704; Nunez U.S. Pat. No. 3,506,977; and Kobashi U.S. Pat. No. 3,759,288.

The safety valve assembly of the present invention, as will be defined in greater detail hereinafter, differs from the devices previously proposed by relying on differential fluid pressure for actuation and deactuation and wherein spring means for biasing structure within the assembly are notably absent.

BRIEF DESCRIPTION OF THE DRAWINGS

FIG. 1 is a longitudinal cross sectional view through the safety valve assembly of the present invention showing the internal structure of the assembly in a normal position thereof.

FIG. 2 is a view similar to FIG. 1 but showing the internal structure in a fluid path blocking position thereof.

DESCRIPTION OF THE PREFERRED EMBODIMENT

Referring now to the drawing in greater detail there is illustrated in FIG. 1 a cross sectional view through the novel safety valve assembly 10 of the present invention, showing the components thereof aligned in a normal postion thereof.

As shown, the assembly 10 includes a hollow body 12, preferably of an elongated cylindrical shape, which has a bore 13 extending axially therethrough. An inlet end 14 and an outlet end 16 of the body 12 are internally theaded at 17 for threaded engagement to removable end caps 18 which each form an end wall 19 for the ends 14 and 16 of the bore 13. Each end cap 18 includes a central throughbore 20 to which conduit forming means (not shown) may be securely engaged.

The inwardly directed end wall forming surface 19 of each end cap 18, bears against a respective end of a stationary tubular sleeve 22 which is disposed within the bore 13.

To assure a sealing engagement between the inwardly directed surface 19 of each cap 18 and a respective abutting end 23 of the tubular sleeve 22, an O-ring 24 is compressed therebetween, within an annular groove 25 provided in the contiguous surfaces thereof.

Positioned within a main axial throughbore 26 of the sleeve is a cylindrical plug member 28 which separates the throughbore 26 into an inlet end 30 and an outlet end 32. To assure a sealing engagement of the plug member 28 against an inside surface 33 of the sleeve 22, a small diameter O-ring 34 has been provided within an annular groove 36 formed in the circumference of the plug member 28, at an appoximately central location along the length of the plug member 28.

The plug member 28 has an axial throughbore 38 of small diameter which slidably supports therein a small pilot pin 40. Again, to ensure that fluid cannot cross via this path, an O-ring 42 of suitable dimension is provided within an annular groove 44 surrounding the pin 40 in a manner which will not interfere with longitudinal motion of the pilot pin 40.

The pilot pin 40 is provided with a predetermined length for maintaining a predeteremined distance between a primary inlet piston 46 and a secondary outlet piston 48 of the assembly 10, which are slidably contained within respective ends 30 and 32 of the axial throughbore 26 within the piston sleeve 22.

To provide a flow path through the assembly 10, which has the outlet end 32 of the bore 26 effectively isolated from its inlet end 30 by the plug member 28, the sleeve 22 is seen to includes a passageway 50 cut into an external surface thereof which lies parallel to the axial throughbore 26. The passageway 50 leads first from a radial inlet port 52 positioned to communicate with the inlet end 30 of the bore 26 to a radial discharge port 54 comunicating with the outlet end 32 of the axial throughbore 26.

An inlet end 56 of the passageway 50 is bifurcated to produce a secondary inlet 58 into the passagaway 50, lying in the plane of the passageway 50, which is sealed by a bleeder valve assembly 60 seated within a contiguous radial port 62 extending through the thickness of the sleeve 22 and the cylindrical body 12.

When the internal structure of the assembly 10 is positioned as shown in FIG. 1, it will be realized that the radial ports 52 and 54 of the passageway 50 allow fluid entering the assembly 10 to freely flow from the inlet end 30 to the outlet end 32 through the passageway 50.

Returning now to the pistons 46 and 48, it will be seen that a body portion 64 of the primary piston 46 is approximately equal in diameter to the diameter of the throughbore 26 and is shown in FIG. 1 abutting the inlet end cap 18. The piston 46 also includes a center reduced in diameter portion 66 which separates the body portion 64 from an outwardly stepped valve element 68 of the piston 46. This valve element 68 abuts the pilot pin 40, which will act as a drive pilot for the primary piston 46 as will be defined hereinafter.

The secondary outlet piston 48 includes a narrow pin engaging collar portion 70 and a contiguous body portion 72 which is approximately equal in diameter to the diameter of the throughbore 26 which in turn steps down to form a base portion 74 approximately equal in diameter to the diameter of the pin engaging collar portion 70 thereof. To assure a sealing yet slidable engagement between the secondary outlet piston 48 and the inner surfaces 33 of the piston sleeve 22, an O-ring 76 is seated within an annular groove 78 formed in the body portion 72 of the piston 48.

It will be seen that both pistons 46, 48 incorporate a central axial passageway 80 (illustrated in phantom) therein which is vented into the throughbore 26 by a diametric crossbore 82. The crossbore 82 is of a diameter equal to the diameter of the central axial bore 80 within each piston 46, 48 which in turn is equal in diameter to the throughbore 20 in each end cap 18.

The crossbore 82 in the primary inlet piston 46 is formed within the center portion 66 thereof while the crossbore 82 within the secondary piston 48 is formed in the base portion 74 thereof.

It will be seen that the axial bore 80 within each piston 46, 48 is aligned with the throughbore 20 in each end cap 18 to form a continuation of the throughbore 20, as necessary.

The collar portion 70 of the secondary piston 48 defines between its periphery and the inner surface 33 of the piston sleeve 22 an annular area 84 which, when the internal structure of the assembly 10 is aligned as shown in FIG. 1 aligns with an open radial port 86 formed through the thickness of the sleeve 22 and body 12. This open radial port 86 will be described in greater detail in connection with the description of FIG. 2.

Returning now to the plug member 28, with particular reference to the configuration of the valve member 68 of the primary piston 46, it will be seen that an inlet end 88 of the plug member 28 is of a unique configuration.

In this respect, the plug member 28 has an inwardly stepped abutment surface 90. This abutment surface 90 is formed as an inwardly regressed center section 90 of the plug member 28 which is surrounded by an annular peripheral lip 92.

The diameter of the center section 90 surrounded by the lip 92 is seen to be equal to the diameter of the valve element 68 of the primary piston 46.

As illustrated in FIG. 2, when a condition arises during which the valve element 68 of the primary piston 46 is moved into engagement within the peripheral lip 92, the valve element 68 abuts the abutment surface 90, creating a seal. In order to ensure that such a seal is maintained intact, an annular groove 94 is provided around the circumference of the valve element 68 and within such groove 94 an O-ring 96 of appropriate diameter is placed.

The plug member 28, includes a radial bore 100 within a portion of the peripheral lip 92, with the bore 100 also extending slightly into the abutment surface 90 of the plug member 28.

It will be seen that this radial bore 100 provides a path into inlet port 52 of the passageway 26 for fluid entering the inlet end 14 of the assembly 10.

It will fruther be seen that the radial bore 62 of the bleeder valve assembly 60 is positioned so that the lip 92 of the plug member 28 does not interfere with communication of the bore 62 with the inlet end 30 of the throughbore 26.

An outlet end 102 of the plug member 28 is planar and the collar portion 70 of the secondary piston 48 seats thereagainst when the assembly 10 is in the standby mode shown in the FIG. 1.

The alignment of these internal structures of the assembly 10 as shown in FIG. 1 exists when the valve assembly 10 is in a standby mode of operation. This standby mode of operation is maintained for the system 10 when there is an equalized pressure existing at both the inlet end 14 and the outlet end 16 of the assembly 10.

In this respect, fluid within the closed fluid system incorporating the assembly 10 enters inlet end 14 of the assembly 10 via the bore 20, enters an inlet end of the bore 80 in primary piston 46 which is flush thereagainst, and exits from same through crossbore 82. The fluid then fills the inlet end 30 of the throughbore 26 surrounding the valve element 68 of the piston 46 and flows into the center section 90 of the plug 28, into the bore 100 leading to the inlet port 52 of the passageway 50. The passageway 50 carries the fluid to the outlet end 16 of the assembly 10, with the fluid entering the outlet end 32 of the throughbore 26 via the outlet port 54 of the passageway 50.

Due to the pressure of the fluid entering the inlet end 14 of the assembly 10, the fluid within the outlet end 32 of the throughbore 26 is eventually forced outward of the assembly 10 via the throughbore 20 in the end cap 18 at the outlet end 16 of the assembly 10.

It will be understood that the bore 80 and the crossbore 82 of the secondary piston 48 will, when the system 10 is in the standby mode of operation, also be filled with fluid.

At a time when the system 10 shifts into a fluid path blocking position thereof, several things take place within the system 10, as illustrated in FIG. 2.

In this respect, when a pressure loss condition (leak) arises within the closed system downstream of the assembly 10, pressure biasing fluid flow at the outlet end 16 of the assembly 10 drops significantly, allowing fluid to enter the inlet end 30 of the throughbore 26 much more rapidly.

As this occurs, pressure on the wall of the bore 80 of the primary piston 46 increases while pressrue against the secondary piston 48 within the bore portion 32 at the outlet end 16 of the assembly 10 decreases, as does the pressure within the throughbore 26 in the area downstream of the body portion 64 of the primary piston 46.

The valve assembly 10 is calibrated so that such pressure differential developed within the assembly 10 will immediately force the primary piston 46 against abutment surface 90 within the plug member 28 and, via the pilot pin 40, shunt the secondary piston 48 toward and against the inner surface 19 of the cap member 18 at the outlet end 16 of the assembly 10.

When the pistons 46 and 48 have shifted to this position, the valve element 68 of the primary piston 46 seats within center section 90 of the plug member 28, sealing off communication between inlet end 30 of throughbore 26 and bore 100 leading into entry port 52 of passageway 50. with the valve element 68 seated thusly, the fluid path through passageway 50 is effectively blocked, sealing off the position of the fluid system which is downstream of the assembly 10 from the remainder of the closed fluid system.

Upon creation of such a fluid path blockage, fluid loss through the downstream leak within the closed fluid system is eliminated and pressure upstream of the assembly 10 within the closed fluid system is stablilized.

The assembly 10 will remain in this blocking condition until the leak is repaired and one "bleeds" the line of the fluid system incorporating the assembly 10. It will be understood that a "locking" of the closed fluid system, such as in a brake system, for example, would not take place with the asembly 10 inasmuch as a single defective brake line would be isolated, allowing the remaining brake lines to function normally.

The bleeder valve assembly 60 has been provided to bleed the assembly 10 and return same to its normal standby condition. Once the leak within the closed fluid system has been eliminated, the bleeder valve assembly 60 is operated in a manner to cause a screw threaded element 104 thereof to move outwardly of the assembly 10, creating a fluid path to passageway 50 in the sleeve member 22 via the radial port 62. When the passageway 50 is once again placed into fluid continuity with the inlet end 30 of the throughbore 26, fluid courses through the secondary inlet 62 down the passageway 50, and into the outlet end 32 of the bore 26 surrounding the base portion 74 of the secondary piston 48.

Fluid then enters the diametric crossbore 82 of the secondary piston 48, and fills the bore 80 in the piston 48.

At the same time, fluid pressure is being applied by the fluid entering the assembly 10 against a portion of a pin contacting surface 106 of the valve element 68 of the primary piston 46 extending into the bore 100.

Further, fluid pressure is also being applied against a stepped wall surface 108 of the body portion 64 of the primary piston 46.

These additive applied fluid pressures generate motion to pistons 46 and 48 so as to move the secondary 48 piston away from the outlet end cap 18 against which it is abutting, in turn pushing pilot pin 40 away from the outlet end 16 of the asembly 10, in turn assisting and guiding primary piston 46 toward the inlet end 14 of the assembly 10.

Once such motion is precipitated, and the fluid finds its way between the secondary piston 48 and the respective end cap 18, a stablization is again created within the system 10, shunting same back into the standby position illustrated in FIG. 1.

Upon stabilization of the system 10, the screw threaded element 104 of bleeder valve assembly 60 is returned to its engaged position within port 62, and the system 10 is once again placed on standby.

It will be understood that the screw threaded element 104 is similar in configuration to a bolt. Only a cap member 110 of the element 104 is screw theaded engages a screw threaded area 112 of the bore 62 adapted ot engage cap member 110 therein.

In order to assure that no leakage occurs around the element 104 of the bleeder valve assembly 60, a primary seal is created between a depending portion 114 of the element 104 and the surrounding surface of the sleeve 22 by an O-ring 116 seated on the depending portion 114. A secondary seal is provided between the depending portion 114 and surrounding surface of the assembly body 12 by a second O-ring 118.

Turning now to the outlet end 32 of the throughbore 26, the bore 86, as defined above, extends through the body 12 and sleeve 22 into communication with the annular space 84 surrounding collar portion 70 of the secondary piston 48. The bore 86 has been provided to vent the annular space 84 so that the secondary piston 48 is not acting against a vacuum when moved toward the outlet end 16 of the assembly 10.

Accordingly, as the pistons 46 and 48 move to the fluid path blocking position of FIG. 2 and the annular space 84 increases in size, air is drawn into the annular space 84 via the radial bore 86.

Alternatively, when the pistons 46 and 48 move into the standby position of FIG. 1, air is expelled from within the annular space 84 via the bore 86.

As described above, the assembly 10 of the present invention has a number of advantages, some of which have been described above and others of which are inherent in the invention. Also, modifications can be made to the assembly 10 of the present invention without departing from the teachings thereof. Accordingly, the scope of the invention is only to be limited as necessitated by the accompanying claime.

I claim:

1. A safety valve assembly for use in a closed fluid system to seal off a portion of the system downstream of the assembly when the downstream portion develops a leak therein, said assembly comprising:

a hollow cylinder forming a body having an inlet end and a outlet end;

a hollow cylindrical sleeve fitting within and extending along the interior of the cylinder, said sleeve including an external axial passageway;

end caps closing the ends of said cylinder and having axial throughbores therein;

a plug member within said cylindrical sleeve dividing the interior space within said cylindrical sleeve into an an inlet end chamber and an outlet end chamber;

inlet means communicating with said inlet chamber, and one end of said external passageway of said sleeve;

outlet means communicating with said outlet chamber, and another end of said external passageway of said sleeve;

reciprocating pistons freely slidable within said inlet chamber and within said outlet chamber;

said piston means being maintained in relative position by a pilot pin slidably retained within axial passage means within said plug member between said pistons;

passage means extending through said pistons permitting controlled fluid flow therethrough to and between said inlet and said outlet chambers via said external passageway in said sleeve;

said pistons being slidable within said chambers to control access to said external passageway in said sleeve;

said external passageway being maintained open in response to an equalized pressure within the assembly and said pistons being moved into a passageway closing position in response to a loss of fluid pressure within said discharge chamber;

said pistons being adapted to operate solely in response to differential fluid pressure within the assembly.

2. The assembly of claim 1 including a bleeder valve assembly received within a radial bore extending through said sleeve and said cylinder body into the inlet chamber.

3. The assembly of claim 2 wherein said radial bore communicates with a secondary axial inlet to said external passageway of said sleeve.

4. The assembly of claim 3 wherein said reciprocating pistons comprise a primary inlet piston and a secondary outlet piston.

5. The asembly of claim 4 wherein said primary inlet piston incorporates a valve element.

6. The assembly of claim 5 wherein said valve element is receivable within a seat forming recess in an inlet end of said plug member.

7. The assembly of claim 6 wherein said seat forming recess of said plug member incorporates a radial bore therein communicating with said primary inlet to said external passageway in said sleeve.

8. The assembly of claim 7 wherein said valve element seals off communication between said inlet chamber and said radial bore within said plug member when received within said seat forming recess.

9. The assembly of claim 8 wherein a radial vent port is provided for venting an annular passageway surrounding a portion of said secondary piston to atmosphere.

10. The assembly of claim 9 wherein an O-ring is seated in an annular groove surrounding said valve element.

11. The assembly of claim 10 wherein an O-ring is seated between contiguous surface of said end caps and said sleeve ends.

12. The assembly of claim 11 wherein an O-ring is seated between the periphery of said plug and an inner surface of said sleeve.

13. The assembly of claim 12 wherein an O-ring is seated between an inner surface of said plug and the pilot pin.

14. A safety valve assembly for isolating a defective portion of a closed fluid system from the remaining portion thereof, said assembly including:
 a first channel communicating at one end thereof with a fluid inlet port and communicating with a first end of a passageway parallel;
 a second channel communicating at one end thereof with a fluid outlet port and communicating with a second end of said passageway;
 said first and second channels lying in the same longitudinal plane and being separated from one another by a plug member seated therebetween;
 a primary piston slidably received within said first channel;
 a secondary piston slidably received within said second channel;
 said primary and secondary pistons being maintained a predetermined distance apart via a pilot pin slidably retained within an axial bore in said plug member;
 said primary piston normally being seated against the inlet port to said first channel and said secondary piston normally being seated against said plug;
 said primary piston including a valve element, said plug member including a valve seat for same, and said first end of said parallel passageway opening into said valve seat;
 said pistons being adapted to slide toward said outlet port of said assembly upon creation of a differential fluid pressure within said assembly to engage said valve element of said primary piston within said valve seat of said plug member, closing off communication between said first channel and said passageway, thereby isolating a protion of the closed fluid system downstream of said safety valve assembly from the remainder of the closed fluid system.

15. A safety valve assembly for isolating a defective portion of a closed fluid system from the remaining portion thereof, said assembly including:
 a first channel communicating at a first end thereof with a fluid inlet port and communicating with a first end of a passageway parallel to said channel;
 a second channel communicating at one end thereof with a fluid outlet port and communicating with a second end of said passageway; and
 means for selectively blocking communication between said first channel and said first end of said passageway parallel to said channel;
 said means for blocking communication between said first channel and said passageway parallel to said channel operating in response to creation of a differential fluid pressure within the channels of the assembly for creating a fluid tight seal between said channels.

16. The assembly of claim 15 wherein:
 said first and second channels lie in the same longitudinal plane and are separated from one another by a plug member seated therebetween and wherein:
 a primary piston is slidably received within said first channel, and
 a secondary piston is slidably received within said second channel, with said pistons being maintained a predetermined distance apart by a pilot pin slidably retained in a fluid tight manner within an axial bore in said plug member.

17. The assembly of claim 16 wherein:
 said primary piston is normally seated against the inlet port to said first channel and said secondary piston is normally seated against said plug; and wherein:
 said primary piston includes a valve element, said plug member includes a valve seat for same, and said first end of said parallel passageway opens into said valve seat.

18. The assembly of claim 17 wherein:
 said pistons are adapted to slide toward said outlet port of said assembly upon creation of a differential fluid pressure within said assembly to engage said valve element of said primary piston within said valve seat of said plug member, closing off communication between said first channel and said passageway thereby isolating a portion of the closed fluid system downstream of said safety valve assembly from the remainder of the closed fluid system.

* * * * *